US008302810B2

(12) United States Patent
Mulhem et al.

(10) Patent No.: US 8,302,810 B2
(45) Date of Patent: Nov. 6, 2012

(54) VEHICLE TISSUE DISPENSER SUPPORTED WITHIN A CUP HOLDER

(75) Inventors: Elie Mulhem, Troy, MI (US); Miguel A. Linares, Bloomfield Hills, MI (US)

(73) Assignee: Elie Mulhem, Troy, MI (US)

( * ) Notice: Subject to any disclaimer, the term of this patent is extended or adjusted under 35 U.S.C. 154(b) by 231 days.

(21) Appl. No.: 12/842,250

(22) Filed: Jul. 23, 2010

(65) Prior Publication Data

US 2011/0204078 A1  Aug. 25, 2011

Related U.S. Application Data

(60) Provisional application No. 61/307,520, filed on Feb. 24, 2010.

(51) Int. Cl.
*B65H 3/00* (2006.01)
(52) U.S. Cl. ............... 221/34; 221/102; 221/129
(58) Field of Classification Search .......... 221/34, 221/102; 222/129
See application file for complete search history.

(56) References Cited

U.S. PATENT DOCUMENTS

| | | | | |
|---|---|---|---|---|
| 3,331,498 A * | 7/1967 | Davies | .................. | 206/494 |
| 4,694,973 A * | 9/1987 | Rose et al. | ................. | 221/46 |
| D420,236 S | 2/2000 | Parkes et al. | | |
| 6,279,775 B1 | 8/2001 | Parkes et al. | | |
| D450,211 S | 11/2001 | Santoni et al. | | |
| 6,318,590 B1 * | 11/2001 | McMurray-Stivers | ......... | 221/45 |
| 6,398,071 B1 * | 6/2002 | Fellers | ................ | 221/174 |
| D462,212 S | 9/2002 | Kureghian | | |
| 6,523,714 B2 * | 2/2003 | Serbiak | ................ | 221/45 |
| 6,702,147 B2 * | 3/2004 | Ashford | ................ | 221/34 |
| 7,014,062 B2 * | 3/2006 | Parris et al. | ................ | 221/34 |
| 7,219,815 B2 * | 5/2007 | Shannon et al. | ............ | 221/305 |
| 7,490,734 B2 * | 2/2009 | Carr | ................ | 221/102 |
| 8,074,841 B1 * | 12/2011 | Craig et al. | ................ | 222/129 |
| 2003/0178336 A1 | 9/2003 | Zomorodi et al. | | |
| 2008/0035662 A1 | 2/2008 | Way | | |

FOREIGN PATENT DOCUMENTS

EP     0818400 A1    1/1998

OTHER PUBLICATIONS

Kleenex Tissue Cups, http://www.strangenewproducts.com/2005/11/kleenex-tissue-cups.html, Nov. 21, 2005.
"TissueKups: The Greatest Innovation in Tissue Dispensing Since the Pop-Up Box!" Business Wire, May 19, 2003.

* cited by examiner

*Primary Examiner* — Timothy Waggoner
(74) *Attorney, Agent, or Firm* — Gifford, Krass, Sprinkle, Anderson & Citkowski, P.C.; Douglas J. McEvoy (57) ABSTRACT

A tissue dispenser for use with a cup holder having a body including a lower portion dimensioned for being received within an inner wall associated with the cup holder. An opening is provided in the body for withdrawing successive tissues. A waste storage compartment is configured within the body separate from the opening for storing used tissues.

11 Claims, 7 Drawing Sheets

VEHICLE TISSUE DISPENSER SUPPORTED WITHIN A CUP HOLDER

CROSS-REFERENCE TO RELATED APPLICATIONS

This application claims the benefit of U.S. Provisional Application 61/307,520 filed on Feb. 24, 2010.

FIELD OF THE INVENTION

The present invention is directed to a vehicle interior tissue dispenser in the form of a cup like article and which is particularly suited for supporting within a vehicle cup holder.

BACKGROUND OF THE INVENTION

The prior art is documented with various types of tissue dispensing devices such as manufactured by Kimberly-Clark under the brand name Kleenex®. Among these are included a generally plastic cylindrical shaped container holding fifty tissues produced under the name Kleenex Tissue Cups.

SUMMARY OF THE INVENTION

The present invention discloses a durable and re-usable tissue dispenser for use with a cup holder having a body including a lower portion dimensioned for being received within an inner perimeter wall associated with the cup holder. An opening is provided in the body for withdrawing successive tissues. A waste storage compartment is configured within the body separate from the opening for storing used tissues. The body can further be constructed of a corrugated board material, plastic or admixed composite and can further exhibit antimicrobial properties. Additional variants can include the provision of resistive gripping elements along a lower region of the body exterior and in order to provide enhanced gripping within the perimeter defined wall associated with the cup holder.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Referring to the several embodiments subsequently described, and with initial reference to the environmental view of FIG. 1, the present invention discloses a vehicle interior tissue dispenser, generally depicted at 10 in the form of a generally conical/tapered or frusto-conical shaped and cup like article and which is particularly suited for supporting within a cup holder (further referenced by annular side wall 2 associated with a vehicle interior, such vehicle further understood to include without limitation any of a land, sea or air type vehicle). More specifically, the present invention discloses a generally a variety of alternately shaped dispensers according to a variety of embodiments incorporating both top and side dispensing compartments suitable for receiving a suitably sized tissue roll. Selected embodiments further include a waste storage compartment for depositing used tissues.

Figure 1:
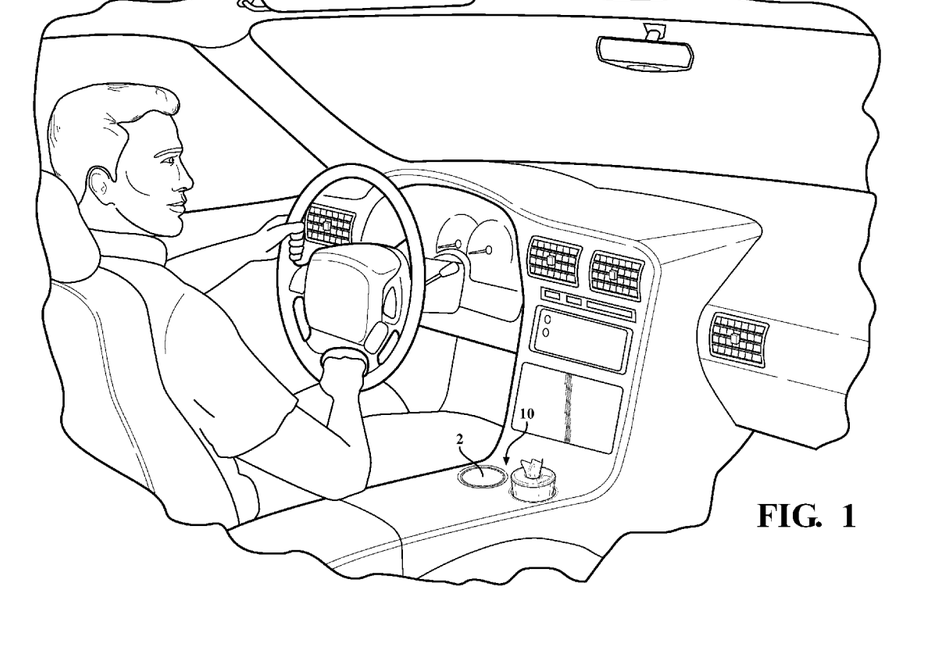
FIG. 1 is an environmental view of the vehicle tissue dispenser device according to the invention.
Figure 2:
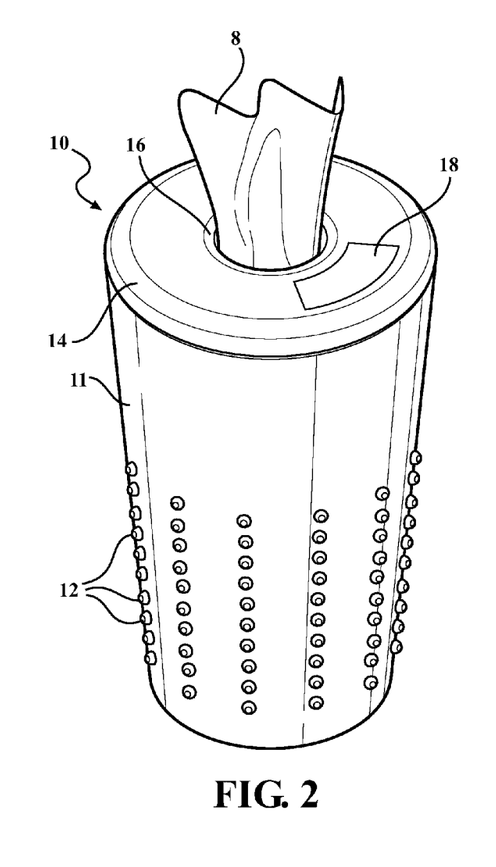
FIG. 2 is a perspective view of a top dispensing tissue dispenser according to an embodiment of the invention.

Referring to FIG. 2, a perspective view is shown at 10 of the top dispensing tissue dispenser also depicted in FIG. 1 according to an initial given embodiment and which incorporates any of a plastic/polymer material or admixture thereof, as well as lightweight metal (e.g. aluminum), or cardboard or any composite material or other suitable material exhibiting the desired properties of light weight and sanitation. Along these lines, an anti-microbial plastic or metal (e.g. silver) can be used in the construction of the dispenser.

Figure 3:
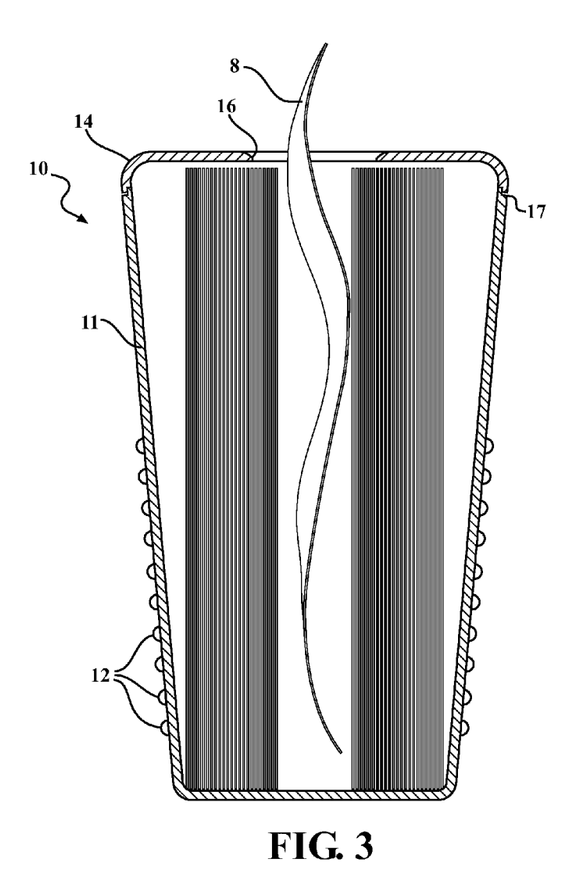
FIG. 3 is a linear cutaway of the tissue dispenser of FIG. 1 and illustration the manner in which an interiorly supported tissue roll is progressively and radially outwardly dispensed.

The dispenser 10 according to the first embodiment exhibits a main body 11 exhibiting a generally cylindrical shape with a slightly enlarged diameter top and a marginally narrowed diameter base (i.e. modified conical, tapered or frusto-conical shape) configured for being received and supported within the conventional cup holder side wall (again at 2 in FIG. 1). As further depicted in succeeding FIG. 3, a selected tissue 8 is provided in drum roll form which is dimensioned for being installed within the open interior of the dispenser 10. The roll is constructed in one non-limiting variant such that the individual tissues 8 are progressively unwound from an inner core in a progressive outward fashion.

Other features include pluralities of resistive and rubberized gripping elements, such as shown at 12, disposed along an exterior surface of the dispenser and typically along the arcuate surfaces associated with a lower portion of the body 11 which resistively seats within the inner side wall 2 and base surfaces associated with the cup holder. A general lid component 14 defines a central opening (via perimeter extending wall 16) and can be removable from the main body in a twist off or other resistive fitting manner (see interconnecting interface 17) in order to provide access to the interior for the purpose of installing a replacement tissue roll.

Also depicted at 18 is an air freshener component which can optionally be built into the lid component 14 (or elsewhere along the body of the device). It is also envisioned that, apart from the circular roll configuration shown, the tissues can be repackaged in plural form according to any cartridge mechanism including but not limited to a planar stacked fashion similar to existing tissue boxes.

Figure 4:
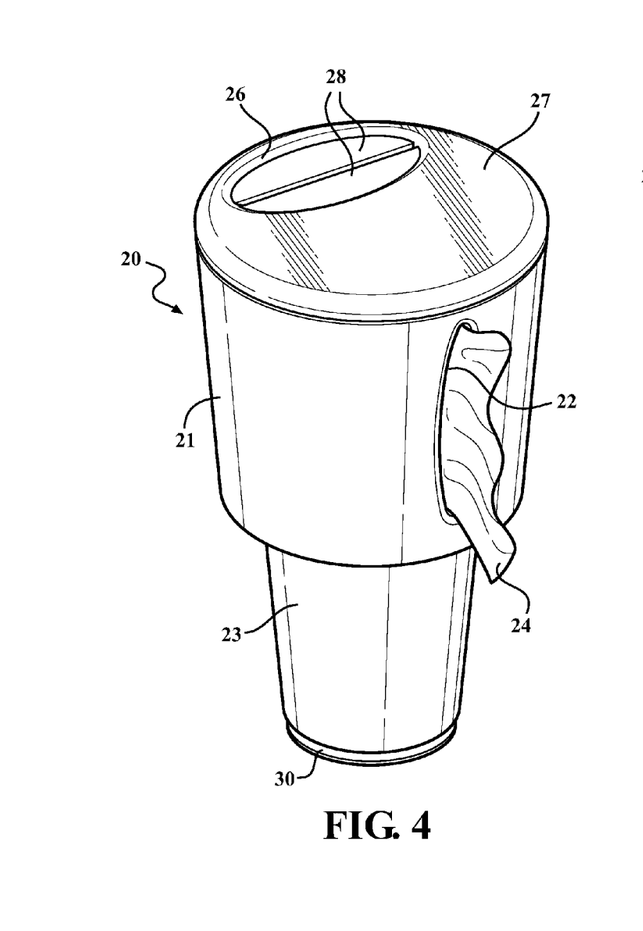
FIG. 4 is a perspective view of a tissue dispenser according to another embodiment and incorporating a side disposed channel for facilitating dispensing of tissues from an interiorly supported roll in a progressively inward dispensing fashion in combination with a top accessible and separate used storage compartment.
Figure 5:
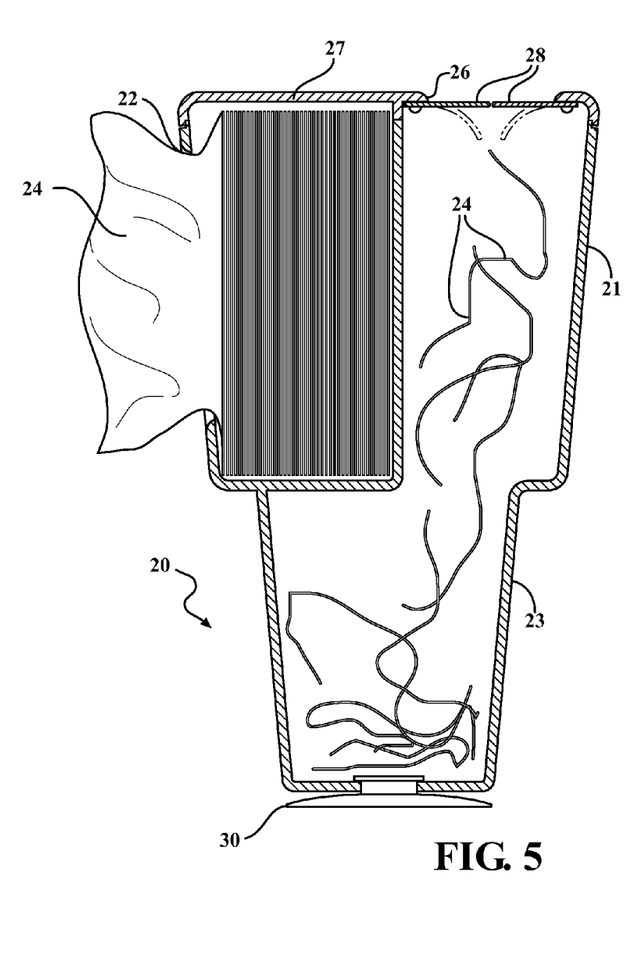
FIG. 5 is a linear cutaway view of the tissue dispenser of FIG. 4 and illustrating the side roll dispensing compartment and height extending nature of the top accessible waste storage compartment.

Referring now to FIG. 4, a perspective view is generally shown at 20 of a tissue dispenser according to another embodiment exhibiting a body with an enlarged diameter upper portion 21 and a non-continuous and reduced diameter lower portion 23, and further incorporating a side disposed, generally narrowed oval shaped channel defined by an inner perimeter 22 for facilitating dispensing of a resized tissue roll 24 (see further FIG. 5) interiorly supported in a progressively inward dispensing fashion. In combination, a top accessible and separate used tissue storage compartment is provided, this including a further generally widened ellipsoidal shaped and inner perimeter extending wall 26 exhibited in a fitted and removable top 27 in contact with an upper rim of the main body (again shown by enlarged diameter upper portion 21) in similar fashion as previously depicted in embodiment 10 shown in FIG. 3.

A pair of aligning and deflectable leaf-type valves 28 are further provided, such as constructed of a flexible rubberized or like material in secured fashion to the inside of the lid in contact with the perimeter extending wall 26. In use, the deflectable leafs are downwardly and depress-ably deflected (see again FIG. 5) in order to allow a user to deposit waste items such as including (without limitation) previously used tissues 24. A lower portion of the dispenser in FIG. 4 further illustrates a variation of resistive engagement portion (alternative of or in addition to the rubberized gripping portions) and depicting a bottom disposed suction cup 30 mounted to a bottom face of the lower portion 23 and for assisting in establishing a gripping or suction condition of the dispenser upon a smooth surface (not limited to a vehicle interior) and which may be associated with locations other than cup holder 2.

Figure 6:
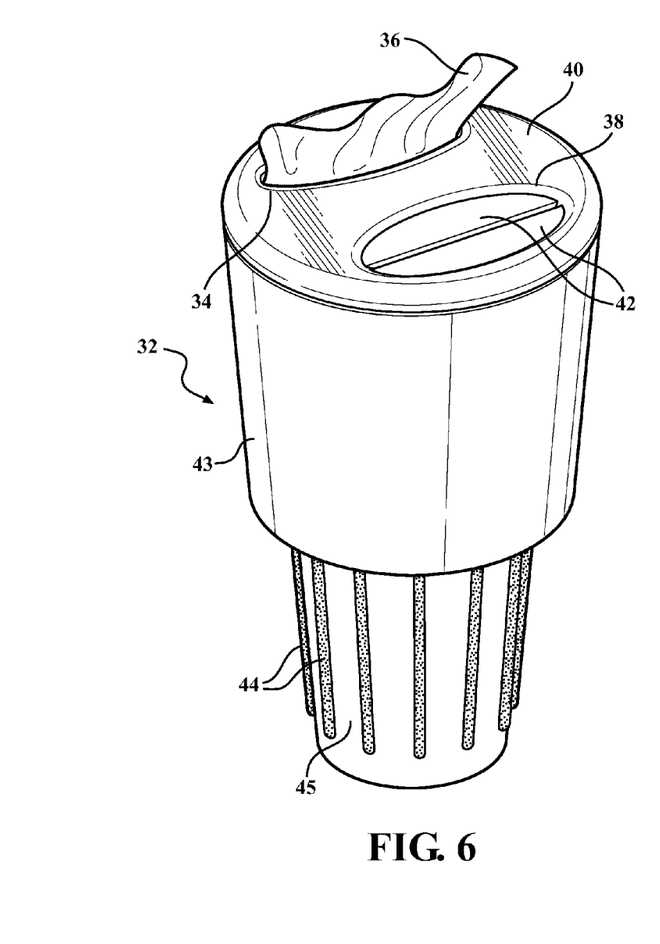
FIG. 6 is a perspective view of a tissue dispenser of according to a further embodiment and which incorporates the aspects of a top dispenser incorporated into the general configuration also shown in FIG. 4 including the top accessible waste storage compartment.

FIG. 6 is a perspective view at 32 of a tissue dispenser according to a further embodiment and which again incorporates the aspects of a top dispenser (see ellipsoidal shaped inner perimeter wall 34 for dispensing tissues 36) incorporated into the general configuration also shown in FIG. 4 and including the top accessible waste storage compartment. This again includes a further generally widened ellipsoidal shaped and inner perimeter extending wall 38 exhibited in an attachable/removable top 40 of the dispenser (see again interface 41 for securing top 40 to upper enlarged diameter portion 43 again interconnecting with a lower reduced diameter portion 45).

Figure 7:
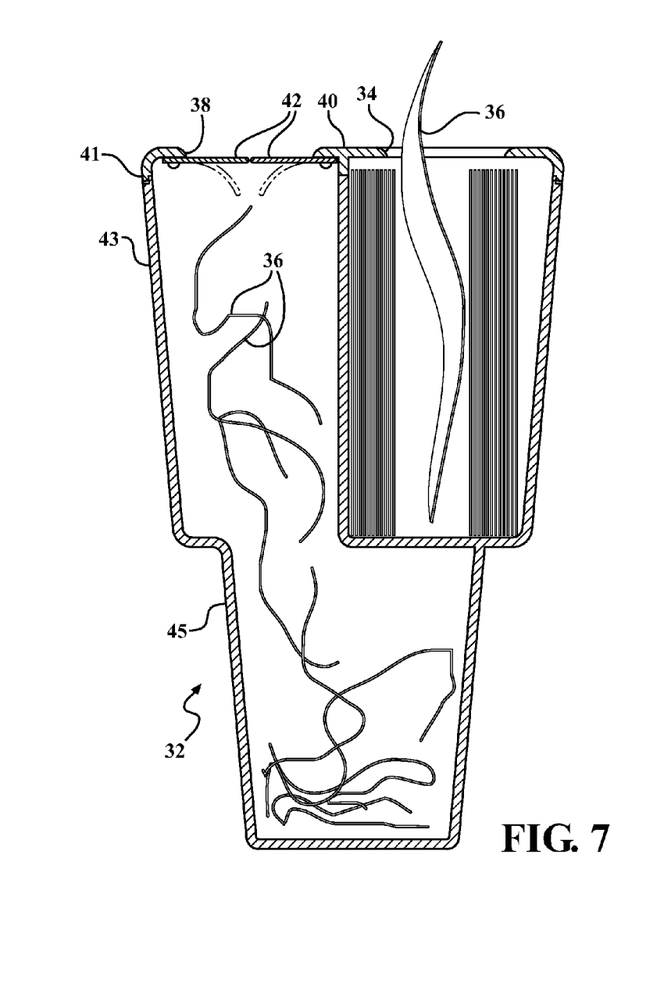
FIG. 7 is a linear cutaway view of the top retrieving tissue dispenser of FIG. 6 in comparison to that illustrated in the linear cutaway of FIG. 5.

A pair of aligning and deflectable leaf-type valves 42 are again provided and are downwardly and depress-ably deflected in order to allow a user to deposit waste items (such as including again without limitation) used tissues, again at 36 as shown in FIG. 7, within an generally lengthwise extending interior accessible compartment. A variation of elongated, resistive and rubberized gripping elements 44 are further illustrated in FIG. 6 disposed along an exterior surface of the dispenser associated with the lower reduced diameter portion 45.

Figure 8:
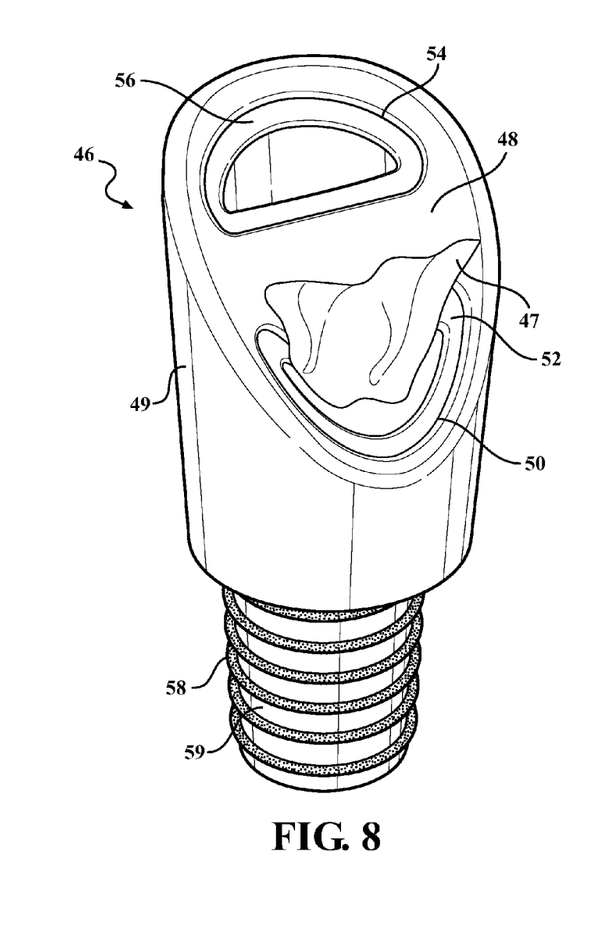
FIG. 8 is a perspective view of a tissue dispenser according to a related sub-variant to that shown in FIG. 6 and illustrating an angled top dispensing surface.

FIG. 8 is a perspective view generally at 46 of a tissue dispenser according to a related sub-variant to that shown in FIG. 6 and illustrating an angled top dispensing surface 48 releasably secured over a main body (collectively shown at 49). A lower tissue 47 dispensing compartment (see FIG. 15) is accessible through a reconfigured, generally arcuate perimeter enclosed profile 50 exhibiting a general smiley face defined in the top surface 48 and which is trimmed with an inner extending and flexible skirt portion 52.

Figure 9:
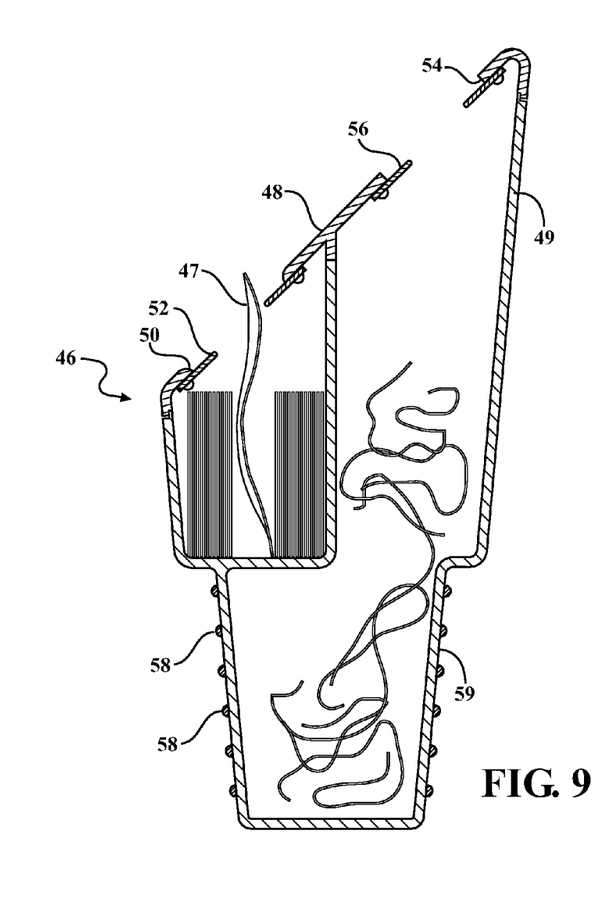
FIG. 9 is a linear cutaway view of the tissue dispenser of FIG. 8.

An upper adjoining portion of the top surface 48 further exhibits a storage compartment (see again FIG. 9) which is accessible through a further arcuate and perimeter extending inner surface 54 again including an inner trimmed and flexible skirt portion 56. Also depicted upon the lower portion of the dispenser is a variation of spiral extending rubberized gripping elements, see continuous spiral pattern at 58, disposed along a lower reduced diameter portion 59 connected with upper portion 49 and upon the exterior arcuate surface of the dispenser in communication with the cup holder perimeter wall (again at 2 in FIG. 1).

Figure 10:
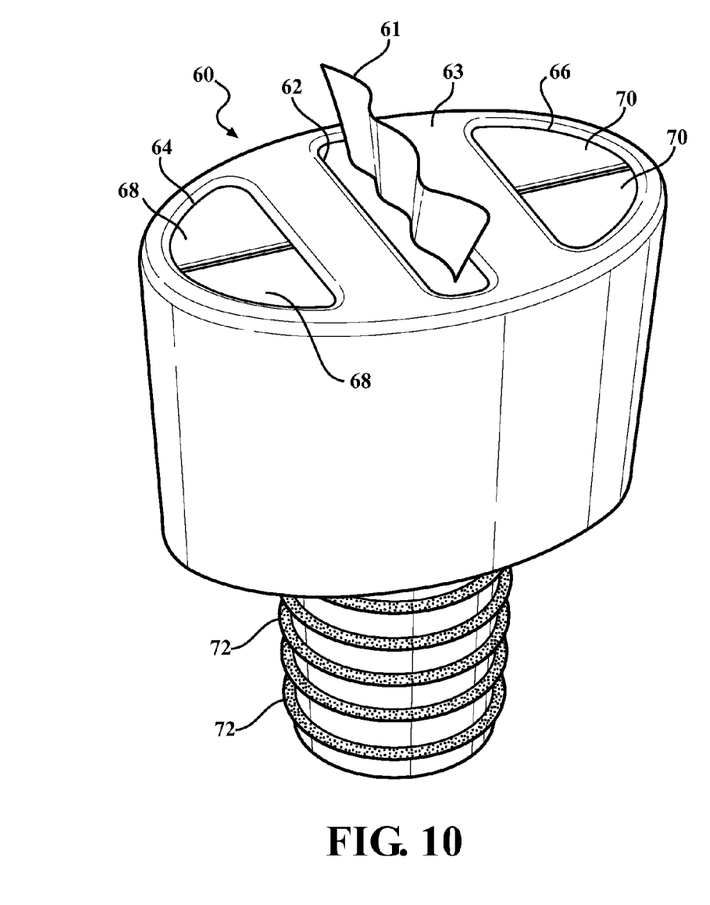
FIG. 10 is a perspective view of a tissue dispenser according to a yet further embodiment and including a central disposed top dispenser in combination with first and second side and top accessible waste storage compartments.
Figure 11:
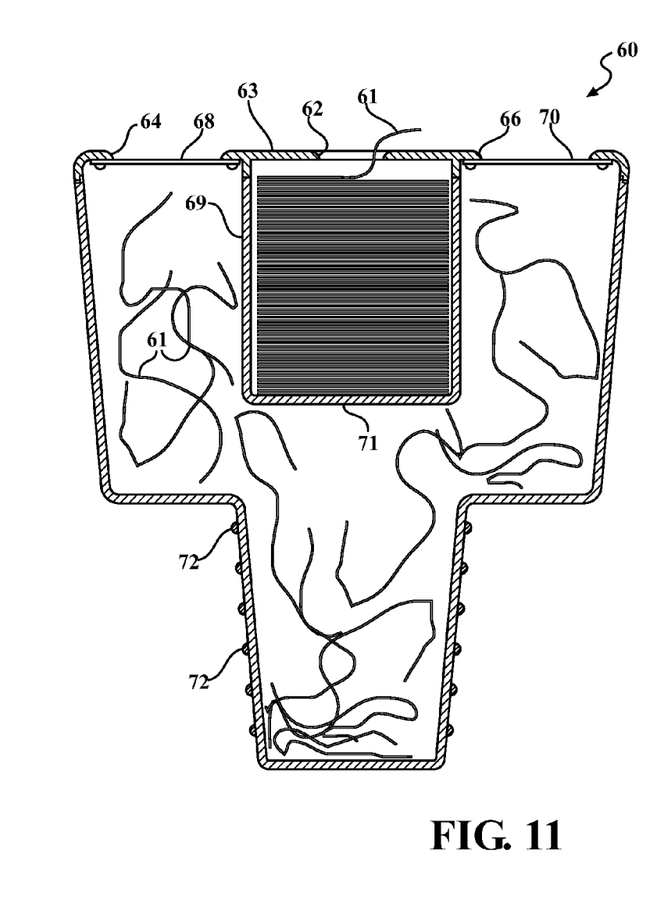
FIG. 11 is a linear cutaway view of the tissue dispenser of FIG. 10.

FIG. 10 is a perspective view, at 60, of a tissue dispenser according to a yet further embodiment and including a central disposed top dispenser of tissues 61 (see inner channel configured perimeter surface 62 defined in removable lid or top 63) which separates first (inner perimeter 64 with deflectable leafs 68) and second (inner perimeter 66 with deflectable leafs 70) accessible waste storage compartments accessible through the top 63 of the dispenser. The cutaway of FIG. 11 illustrates the configuration of the inner central and top mounted inner compartment for supporting the tissue cartridge (see side wall 69 and interconnected base wall 71) Also illustrated is the provision of spiral extending rubberized gripping elements 72 similar to those shown in FIG. 8 for gripping the inner perimeter side wall of the associated cup holder.

Figure 12:
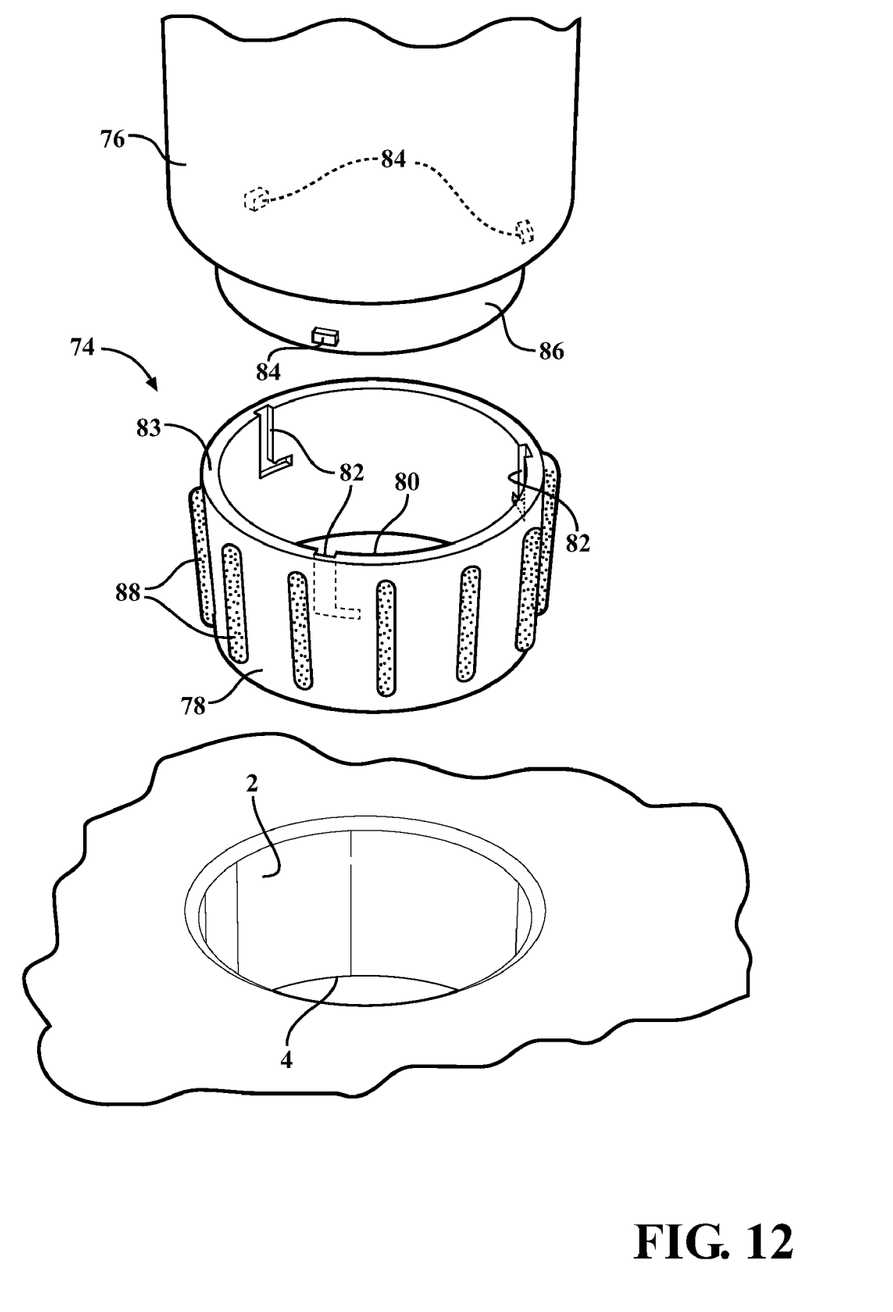
FIG. 12 is a partially exploded view illustrating a two part tissue dispenser with upper tissue holding compartment and lower ballasting and twist lock assembleable component exhibiting rubberized gripping portions.

Finally, and referring to FIG. 12, a partially exploded view is generally depicted at 74 of a two part tissue dispenser with upper tissue holding compartment, see as depicted by generally cylindrical body 76. A lower assembleable base component 78 (see as depicted as three dimensional end sleeve or ring and further exhibiting an interconnected base support surface 80) is provided and is capable of being secured to a lower portion of the body 76 in any one of a number of different fashions, including such as being threadably engaged (not shown).

In the illustrated embodiment, the base component 78 illustrates a plurality of circumferentially arrayed bayonet slots 82 defined along it inner annular surface in communication with top edge 83. A matching plurality of circumferentially arrayed tabs 84 are defined along a reduced diameter lower portion 86 of the main body 76 and such that the body 76 can be secured to the base 78 in successive depressing and twist lock motion.

Either of the reduced diameter lower portion 86 of the main body 76, or the base component 78, can be weighted in any desired fashion in order to ballast the upper body 76 and to prevent the same from being casually overturned. This can include incorporating the weighted portion into the material construction or possibly by adding weighted washers or the like, such as within the interior of the base component 78. Finally, rubberized gripping portions 88 can be provided in any desired pattern (such as extending vertically in circumferentially spaced fashion about the exterior of the base component 78) and in order to resistively support against the inner extending perimeter wall 2 of the cup holder (see also interconnected base 4).

Having described my invention, other and additional preferred embodiments will become apparent to those skilled in the art to which it pertains, and without deviating from the scope of the appended claims.

We claim:

1. A tissue dispenser for use with a cup holder comprising;
a three dimensional shaped body having a circular cross sectional profile adapted to being seated within a cup holder recess, said body exhibiting an open interior including a tissue dispensing compartment for holding a plurality of tissues dispensable in successive fashion through an opening defined in at least one of a top or side of said body;
a waste disposal compartment separated from said tissue dispensing compartment and extending a height of said body, said waste disposal compartment being larger in volume than said tissue dispensing component and including a top accessible access location for receiving used tissues; and
a resistive engagement portion associated with a lower portion of said body for facilitating contact with the cup holder.

2. The dispenser as described in claim 1, said body exhibiting a specified shape and size and further comprising any of a plastic, metal or cardboard or composite material having an anti-microbial composition.

3. The dispenser as described in claim 1, said resistive engagement portion further comprising a plurality of individual rubberized elements disposed about an exterior surface of said body.

4. The dispenser as described in claim 1, said resistive engagement portion further comprising a bottom disposed suction cup mounted to a bottom face of said body for assisting in establishing a gripping or suction condition when set upon a smooth surface.

5. The dispenser as described in claim 1, said waste disposal compartment further comprising a pair of aligning and deflectable leaf-type valves constructed of a flexible material and secured to a lid of said body in contact with an outer perimeter extending wall to facilitate depositing waste items within said open interior.

6. The dispenser as described in claim 1, said body further comprising an outer diameter upper portion and an integrally connected and reduced diameter lower portion.

7. The dispenser as described in claim 1, further comprising a weighted base component assembleable with said body.

8. The dispenser as described in claim 7, further comprising a bayonet tab and slot arrangement established between a lower portion of said body and said base component.

9. The dispenser as described in claim 1, said top exhibiting an angled profile and through which is accessed each of said tissues and said waste storage compartment.

10. The dispenser as described in claim 9, further comprising a lower tissue dispensing compartment accessible through a reconfigured, generally arcuate perimeter enclosed profile in said top and which is trimmed with an inner extending and flexible skirt portion, an upper adjoining portion of the top further exhibiting said waste storage compartment which is accessible through a further arcuate and perimeter extending inner surface again including an inner trimmed and flexible skirt portion.

11. The dispenser as described in claim 1, said body exhibiting a specified shape and size such that said plurality of tissues are provided as a wound roll.

\* \* \* \* \*